(12) United States Patent  (10) Patent No.: US 8,918,834 B1
Samuelsson  (45) Date of Patent: Dec. 23, 2014

(54) CREATING CUSTOM POLICIES IN A REMOTE-COMPUTING ENVIRONMENT

(75) Inventor: Anders Samuelsson, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 482 days.

(21) Appl. No.: 12/972,196

(22) Filed: Dec. 17, 2010

(51) Int. Cl.
*H04L 29/06* (2006.01)

(52) U.S. Cl.
CPC .............. *H04L 63/20* (2013.01); *H04L 63/102* (2013.01)
USPC .......................................................... 726/1

(58) Field of Classification Search
CPC . G06Q 10/06; G06Q 40/12; G06Q 10/06315; G06Q 10/10; G06Q 10/06312; G06Q 10/06314; G06Q 10/1091; G06Q 30/0241; G06Q 10/063112; G06Q 10/0639; G06Q 10/1097; G06Q 30/0201; G06Q 30/0239; G06F 21/50; G06F 21/552; H04L 63/20
See application file for complete search history.

(56) References Cited

U.S. PATENT DOCUMENTS

| | | | | |
|---|---|---|---|---|
| 6,735,701 | B1 * | 5/2004 | Jacobson | 726/1 |
| 7,650,633 | B2 * | 1/2010 | Whitson | 726/6 |
| 7,716,145 | B2 * | 5/2010 | Kashima | 706/14 |
| 7,716,146 | B2 * | 5/2010 | Moran et al. | 706/15 |
| 7,743,420 | B2 * | 6/2010 | Shulman et al. | 726/25 |
| 8,056,121 | B2 * | 11/2011 | Hamilton et al. | 726/4 |
| 2005/0137925 | A1 * | 6/2005 | Lakritz et al. | 705/8 |
| 2007/0061451 | A1 * | 3/2007 | Villado et al. | 709/224 |
| 2007/0061882 | A1 * | 3/2007 | Mukhopadhyay et al. | 726/23 |
| 2008/0005325 | A1 * | 1/2008 | Wynn et al. | 709/225 |
| 2008/0256010 | A1 * | 10/2008 | Moran et al. | 706/46 |
| 2008/0271109 | A1 * | 10/2008 | Singh et al. | 726/1 |
| 2008/0313116 | A1 * | 12/2008 | Groble | 706/45 |
| 2009/0199296 | A1 * | 8/2009 | Xie et al. | 726/23 |
| 2009/0271844 | A1 * | 10/2009 | Zhang et al. | 726/2 |
| 2009/0307747 | A1 * | 12/2009 | Arnold et al. | 726/1 |
| 2010/0036779 | A1 * | 2/2010 | Sadeh-Koniecpol et al. | 706/11 |
| 2010/0251377 | A1 * | 9/2010 | Shulman et al. | 726/25 |
| 2010/0269170 | A1 * | 10/2010 | Chauhan et al. | 726/12 |
| 2010/0299292 | A1 * | 11/2010 | Collazo | 706/14 |
| 2011/0061111 | A1 * | 3/2011 | Faitelson et al. | 726/28 |
| 2011/0321175 | A1 * | 12/2011 | Slater | 726/28 |
| 2012/0222132 | A1 * | 8/2012 | Burger et al. | 726/28 |
| 2013/0145423 | A1 * | 6/2013 | Cooper | 726/1 |

* cited by examiner

*Primary Examiner* — Michael R Vaughan
(74) *Attorney, Agent, or Firm* — Lee & Hayes, PLLC

(57) ABSTRACT

Techniques for crafting custom policies for entities (e.g., users, applications, etc.) based on past behavior of the entities are described herein. In one example, the techniques are implemented in a network-based environment. In this environment, a remote-computing service may include multiple different resources that provide different services to customers of the remote-computing service. For instance, the remote-computing service may provide a network-based storage service, a network-based compute service, a network-based payment service, or any other network-based resource. Users and/or applications of a particular customer may then access these resources via an interface provided by the remote-computing service. After tracking a user or application's access to these resources for a certain period of time, the remote-computing service may recommend or create a custom policy for the user or application based on the requests made by the user or application.

23 Claims, 6 Drawing Sheets

CREATING CUSTOM POLICIES IN A REMOTE-COMPUTING ENVIRONMENT

BACKGROUND

In remote-computing environments, customers of a remote-computing service may access resources of the service to perform a variety of tasks. For instance, the customers may access a storage resource of the remote-computing service to store data or to obtain or alter previously-stored data. The customers may also access a compute resource of the service to configure an application to run atop the compute resource. The remote-computing service may additionally or alternatively offer any number of other resource types, each of which customers of the service may utilize and access.

In some instances, the remote-computing service may allow an individual customer to create multiple accounts associated with respective users. As such, individual users of a particular customer may access the remote-computing services by providing the respective user's credentials (e.g., username and password). For instance, a business customer that subscribes to a set of services that the remote-computing service offers may create user accounts for each of multiple different employees to allow each of these employees to access needed services. In addition, certain applications associated with the particular customer may need and obtain access to the services provided by the remote-computing service.

Many times, however, a particular customer has a single access policy governing each user's and each application's access to the services of the remote-computing service. This generic access policy often does not meet a customer's needs, as a particular user of the customer may need more or less access than the generic policy grants. In other instances, meanwhile, an administrator of the customer may assign different access policies to different users and/or applications. However, because the administrator may not know exactly what each user or application needs access to—and what the user or application should not or need not have access to—these resulting policies are also often ill-suited for the particular user or application.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
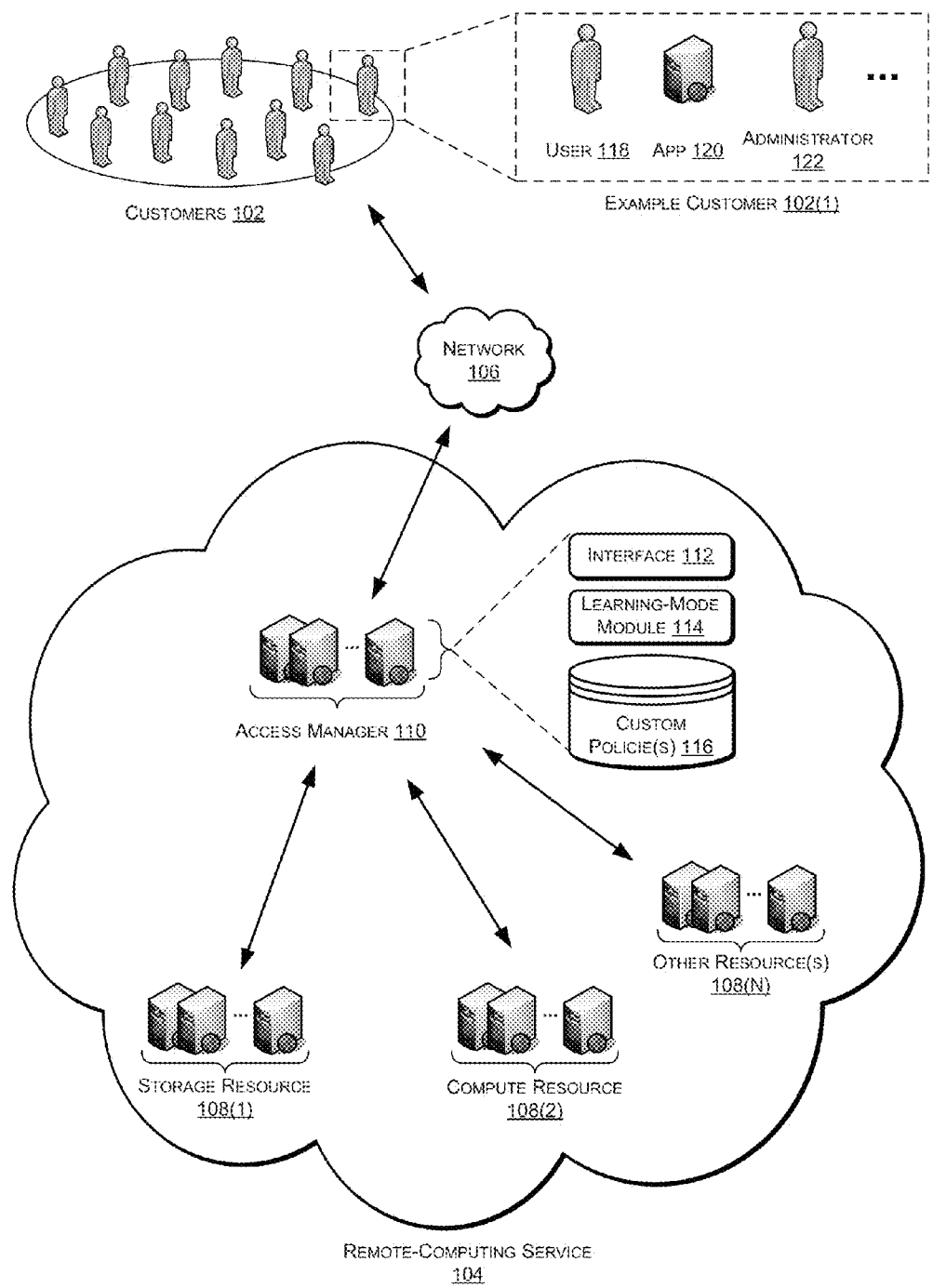
FIG. 1 illustrates an example environment in which users and applications access resources of a remote-computing service according to policies that have been custom for each user and application. In some instances, an access manager of the remote-computing service recommends or creates the custom policies after observing each user's and each application's resource requests for a certain amount of time.

This disclosure describes, in part, systems and techniques for crafting custom policies for entities (e.g., users, applications, etc.) based on past behavior of the entities. In one example, the systems and techniques are implemented in a network-based environment. In this environment, a remote-computing service or other network-based service may include multiple different resources that provide different services to customers of the remote-computing service. For instance, the remote-computing service may provide a network-based storage service, a network-based compute service, a network-based payment service, or any other network-based resource. Users and/or applications of a particular customer may then access these resources via an interface provided by the remote-computing service.

In some embodiments, an administrator of a particular customer may initially enable a learning mode for a particular entity, such as a user or application. For instance, the administrator may assign a learning-mode access policy to the entity, or may indicate in the entity's account that the entity is now operating in learning mode without regard to a particular access policy currently associated with the entity. After doing so, the entity may authenticate with an access manager of the remote-computing service when requesting access to resources of the service. Upon authentication, the access manager may determine that the entity is associated with learning mode and, hence, may track the entity's interactions with the service. In some instances (e.g., where the user has been associated with the learning-mode policy), the access manager may grant the entity access to resources in accordance with this policy. In some instances, this policy allows the entity to access all or substantially all of the resources that are associated with the particular customer (i.e., all or substantially all of the resources that the particular customer has purchased, rented, leased, or otherwise obtained access to from the remote-computing service).

While the entity accesses the resources of the remote-computing service, the access manager of the remote-computing service may track the entity's interactions with the service. That is, the access manager may track which resources the entity is accessing, which application programming interfaces (APIs) the entity is calling, which files the entity is accessing, and the like. After tracking this information for a certain period of time, the access manager may craft a custom access policy for the entity. In some instances, the custom policy, if assigned to the entity, is effective to grant the entity the same access that the entity accessed during the afore-mentioned period of time. In other instances, meanwhile, this policy is broader (e.g., effective to grant the entity access to additional resources, APIs, data, etc.) or narrower (e.g., effective to grant the entity access to fewer resources, APIs, data, etc.).

After crafting this custom access policy, the access manager may assign the policy to the entity or may recommend assignment of this policy to the entity. For instance, the access manager may provide this recommendation to an administrator associated with the particular customer. The administrator may then provide feedback in the form of modifications to the custom policy. For instance, the administrator may broaden certain aspects of the policy and/or may narrow certain other aspects of the policy.

To provide an example, envision that the entity associated with the customer is a software developer, and that the software developer accessed marketing data during the period of time in which the developer had carte blanche access to the resources of the remote-computing service. Because of this, the recommended access policy crafted by the access manager may have included a permission to access this marketing data. The administrator, however, may determine that the developer need not (and/or should not) have access to marketing data. As such, the administrator may narrow the recommend access policy to exclude this recommended permission. Additionally or alternatively, the administrator may see that the custom policy does not include a permission to call a certain API often used by other similarly-situated developers. Upon noticing this, the administrator may broaden the recommended access policy to grant this permission for this developer.

After receiving the feedback from the administrator, the access manager may then create a custom policy for the entity by modifying the recommended policies as specified by the administrator. In some instances, this may be an iterative process, where the access manager recommends polices upon receiving feedback until the administrator decides upon a finalized policy. In either case, when the access manager assigns the custom policy to the entity, the entity now has access to the resources of the remote-computing service in accordance with this custom policy. In some instances, the access manager and/or the administrator may extrapolate this policy to other similarly-situated entities. For instance, the access manager may assign this policy to other developers of this particular customer of the remote-computing service and/ or to developers of other customers of the services.

In another example, the systems and techniques are implemented on a local computing system. For instance, a user may operate a personal computer or any other computing device in learning mode. In response, the computing device or another entity may track the user's interactions to resources (e.g., files, applications, etc.) stored on or accessible by the computing device. In response, the computing device or the other entity may craft a custom policy for association with that particular user. This policy may then be assigned to the user, either automatically or after modifications from the user, an administrator, or another entity, as described both above and below.

For instance, envision that a user "checks out" a laptop computer from an employer of the user. This laptop computer may be configured to track this user's interactions with the laptop. After some set amount of time, then laptop or another entity may then craft (e.g., create and assign, recommend, etc.) a custom access policy for the user, which grants the user access to some or all of the resources that the user accessed during the tracking of the interactions.

In one specific example, the administrator or the user may set up "learning mode" for the user operating the laptop when the user indicates that he or she is operating the laptop for personal purpose or for work purposes. Then, the techniques may craft a custom policy for the user for when the user operates the laptop in "private/personal mode," while crafting another custom policy for the user when the user operates the laptop in "work mode." These access policies may grant the user access to different sets of resources stored or accessible to the laptop.

The discussion below begins with a section entitled "Example Environment" that describes an example environment that may implement the techniques introduced above. A section entitled "Example Processes" follows, and describes example processes for creating custom policies in the environment of FIG. 1 based on previous interactions between an entity and remote-computing resources. Finally, the discussion ends with a brief conclusion.

This brief introduction, including section titles and corresponding summaries, is provided for the reader's convenience and is not intended to limit the scope of the claims, nor the proceeding sections. Furthermore, the techniques described above and below may be implemented in a number of ways and in a number of contexts. Several example implementations and contexts are provided with reference to the following figures, as described below in more detail. However, the following implementations and contexts are but a few of many.

Example Environment

FIG. 1 illustrates an example environment 100 that may implement the described techniques. The environment 100 includes customers 102 of a remote-computing service 104 accessing the service 104 over a network 106. The customers 102 may access the service 104 in the form of human users operating computing devices to access the service 104 and/or applications stored on computing devices controlled by the customers 102 accessing the service 104. For instance, the customers 102 may include users accessing the service 104 with desktop computers, laptop computers, portable digital assistants (PDAs), or any other type of computing device. The customers may also include applications stored on a server or other computing device associated with a respective customer accessing the service 104. The network 106, meanwhile, is representative of any one or combination of multiple different types of networks, such as the Internet, cable networks, cellular networks, wireless networks, and wired networks. The network 106 may be a public or a private network.

As illustrated, the remote-computing service 104 may include a storage resource 108(1), a compute resource 108(2), and a number of other resources 108(N). While FIG. 1 illustrates a few example resources, the service 104 may include more, fewer, and/or different resources in other embodiments. Furthermore, the resources 108(1)-(N) may reside geographically remote from one another (e.g., in different data centers), at a common geographical location (e.g., in a common data center), or even in a common housing of a computing device. That is, the remote-computing service 104 may comprise multiple large-scale data centers having resources situated across the globe, a single computer that stores multiple different resources, or any other environment there between.

In some instances and as illustrated, resources of the service 104 may be embodied as one or more servers that collectively have processing and storage capabilities. These servers may be embodied in any number of ways, including as a single server, a cluster of servers, a server farm or data center, and so forth, although other server architectures (e.g., mainframe) may also be used. Each server may include one or more processors and memory, which may include, but is not limited to, RAM, ROM, EEPROM, flash memory, or other memory technology.

In the illustrated embodiment, the customers 102 may access the remote-computing service 104 via an access manager 110 that provides an interface 112. The interface 112 may represent a web interface or any other technology suitable to allow the customers 102 to access resources of the remote-computing service 104. It is noted, however, that while FIG. 1 illustrates the customers accessing the resources 108(1)-(N) via the access manager 110, the customers 102 may access these resources 108(1)-(N) in any other manner in other embodiments.

FIG. 1 further illustrates that the access manager 110 stores or otherwise has access to a learning-mode module 114 and one or more custom policies 116 (e.g., stored in a database). In some instances, entities associated with the customers 102 may access the resources 108(1)-(N) when these entities are associated with a learning mode. In these instances, the learning-mode module 114 tracks the each of the entity's interactions with the resources 108(1)-(N) and crafts a custom policy for each respective entity.

FIG. 1, for instance, illustrates an example customer 102 (1). As illustrated, the example customer 102(1) may include one or more users having respective user accounts with the remote-computing service 104 (as represented by user 118), one or more applications that are able to access resources of the service 104 (as represented by example application 120), and one or more administrators to help administrate access policies for the users and the applications (as represented by example administrator 122). In some instances, an information-technology (IT) professional of the customer 102(1) may comprise the administrator 122.

In this example, the user 118 or the application 120 may initially be associated with a learning mode as well as with a training-mode access policy, which may grant the user or the application access to all or substantially all of the resources associated with the example customer 102(1). During this time, the learning-mode module 114 may track the interactions (e.g., requests, accesses, etc.) between the user/application and the resources 108(1)-(N) of the remote-computing service 104. At the expiration of the learning-mode policy (e.g., after a set amount of time, after a set amount of interactions, etc.), the learning-mode module 114 may craft a custom policy for association with the particular user or application. This custom policy may grant the user/application access to those resources, API calls, data, and the like that the user/application accessed while operating within the confines of the learning-mode access policy.

After crafting this policy, the learning-mode module 114 may recommend this policy to the administrator 122. The administrator 122 may then accept, reject, or alter (e.g., broaden and/or narrow) the recommended policy. The access manager 110 may then assign this policy, with any modifications provided by the administrator 122, to the particular user/application.

Figure 2:
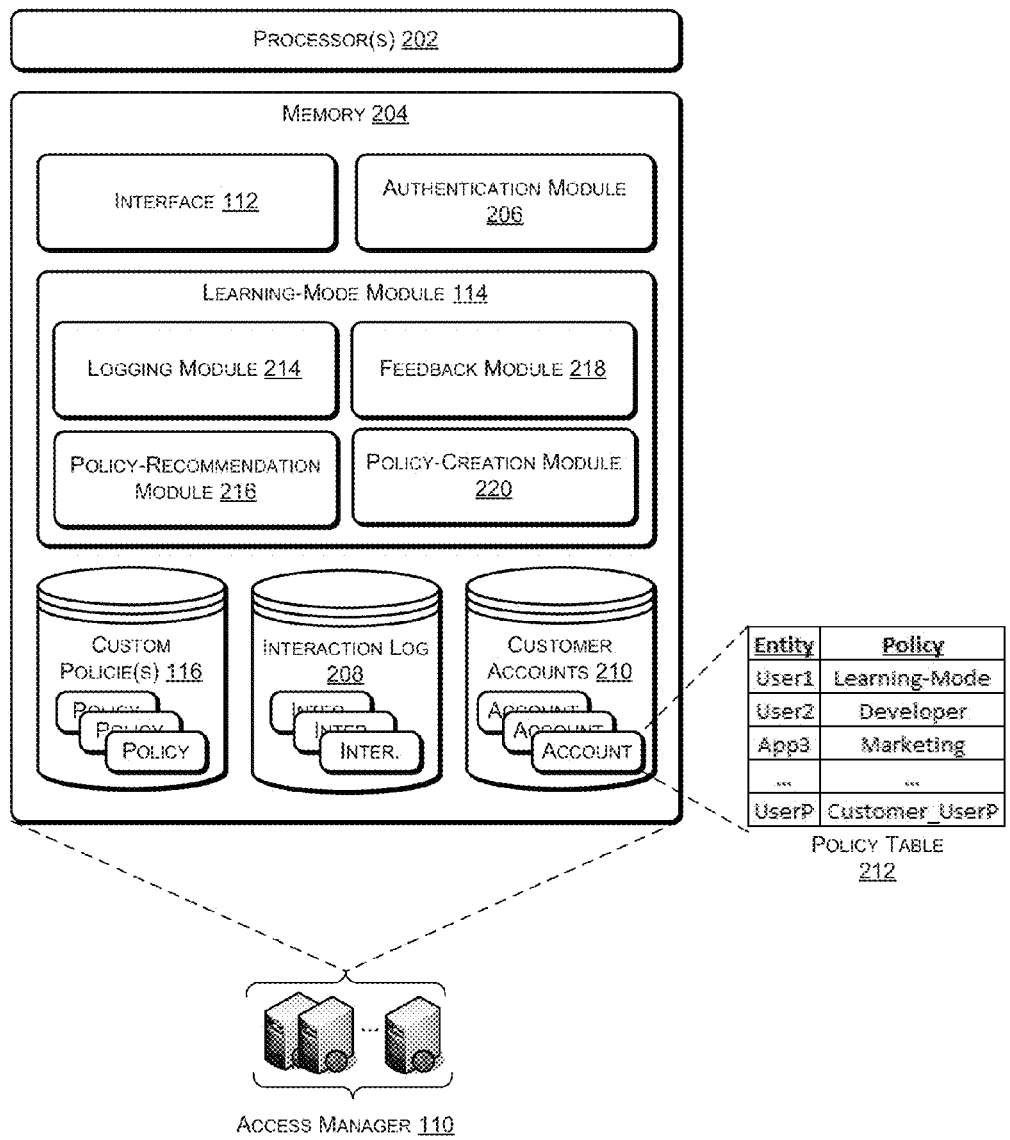
FIG. 2 illustrates example components of the access manager from FIG. 1, along with an example mapping of entities (e.g., users and applications) to respective access policies. As illustrated, one of the example policies is a "learning-mode policy," where the access manager tracks an entity's actions before recommending or creating a custom policy for this entity based on these actions.

FIG. 2 illustrates the access manager 110 of FIG. 1 in further detail. As illustrated, the access manager 110 comprises one or more processors 202 and memory 204. The memory 204 stores or otherwise has access to the interface 112, the learning-mode module 114, and the custom policies 116 described above. In addition, the memory 204 of the access manager 110 stores or otherwise has access to an authentication module 206, an interaction log 208, and one or more customer accounts 210.

As discussed above, a user associated with a particular customer may access the remote-computing service 104 via the interface 112. When the user (or application or other entity) accesses the interface 112, the user may provide credentials, such as a username and password or the like. The authentication module 206 may then authenticate the user and, further, may determine an access policy associated with the user. For instance, the authentication module 206 (or another module of the access manager 110) may reference a customer account associated with the user. This customer account, in turn, may reference a policy table 212 or other data structure that maps each entity associated with the customer to a particular policy. The example policy table 212, for instance, illustrates that a first user ("User1") may currently be assigned to a policy entitled "learning mode," a second user ("User2") may currently be assigned to a policy entitled "developer," an application ("App3") may currently be assigned to a policy entitled "marketing," while an $P^{th}$ user ("UserP") may currently be assigned to a policy entitled "custom_userP."

Addressing these example differing policies in order, the "learning-mode policy" may grant the corresponding user access to a certain set of resources of the remote-computing service 104. For instance, this policy may grant the user access to all or substantially all resources associated with the customer of which the user is a part. The "developer" policy and the "marketing" policy, meanwhile, may comprise access policies that an administrator of the respective customers have deemed appropriate for developers and marketers, respectively. The "custom_userP" policy may comprise a custom policy that has been created for UserP based at least in part on this user's interactions with the remote-computing service 104 while the user was associated with the learning-mode policy.

Furthermore, in some instances, a learning mode may be associated with entities regardless of the current access policies of the entities. For instance, "User2" from above may be associated with the "developer" policy, yet may be still operate in learning mode such that the service tracks this user's interactions with the service for the purpose of altering the access policy currently assigned to the user or for assigning a new access policy to the user.

Returning to the example at hand, after the authentication module 206 authenticates the example user and determines the policy associated with this user, the user may begin accessing resources of the service in accordance with this policy. For this example, envision that the authenticated user is "User1," who is associated with the "learning-mode" policy. As such, the learning-mode module 114 will track this user's interactions, as discussed above.

Turning to the learning-mode module 114, this module may comprise a logging module 214, a policy-recommendation module 216, a feedback module 218, and a policy-creation module 220. When a user or application access the remote-computing service 104 while associated with a learning-mode policy, the logging module 214 may log the interactions between this user or application and the service 104. For instance, the logging module 214 may record the interactions in the interaction log 208. The recorded interactions may include a type/name of a resource accessed, an API call or other interface used to access the resource, the data/file name accessed, a time of day that the user accessed the data, and/or any other information that may be used to craft a custom policy for the user.

After the user operates under the learning-mode policy for a certain amount of time, the policy-recommendation module 216 may recommend a policy for association with the user. This policy may recommend that the user be granted access to any combination of resources, API calls, and data within the remote-computing service 104. For instance, the recommended policy may recommend that the user be allowed to access the same resources and data accessed using the same API calls as utilized by the user while operating in learning mode. In other instances, the recommended policy may be broader and/or narrower in different respects. In still other instances, the recommended policies may grant the user access to certain resources during certain times of day, possibly corresponding to the time of day that the user previously accessed these resources.

In addition to referencing the accessed resources and data and the utilized APIs, the policy-recommendation module 216 may reference other data in some instances to recommend a policy. For instance, the policy-recommendation module 216 may identify users that are similar to the user at hand and may glean information for access policies associated with these users. To provide an example, if the example user is a software developer, the policy-recommendation module 216 may identify resources often accessed by other software developers (of the same customer or otherwise) and may include these resources in the recommended policy.

In some instances the policy-recommendation module 216 may recommend this crafted policy to an administrator, such as the administrator 122 described above. The administrator may then access the access manager 110 via the interface 112 and may provide feedback regarding the recommended policy via the feedback module 218. This feedback may include accepting the recommended policy, rejecting the recommended policy, or altering the recommended policy. The policy-creation module 220 may then create a policy and associate this created policy with the user after taking into account the feedback from the administrator or other entity. In some instances, meanwhile, the policy-creation module 220 may simply assign the recommended policy to the user without feedback of the administrator or otherwise.

Example Processes

Figure 3:
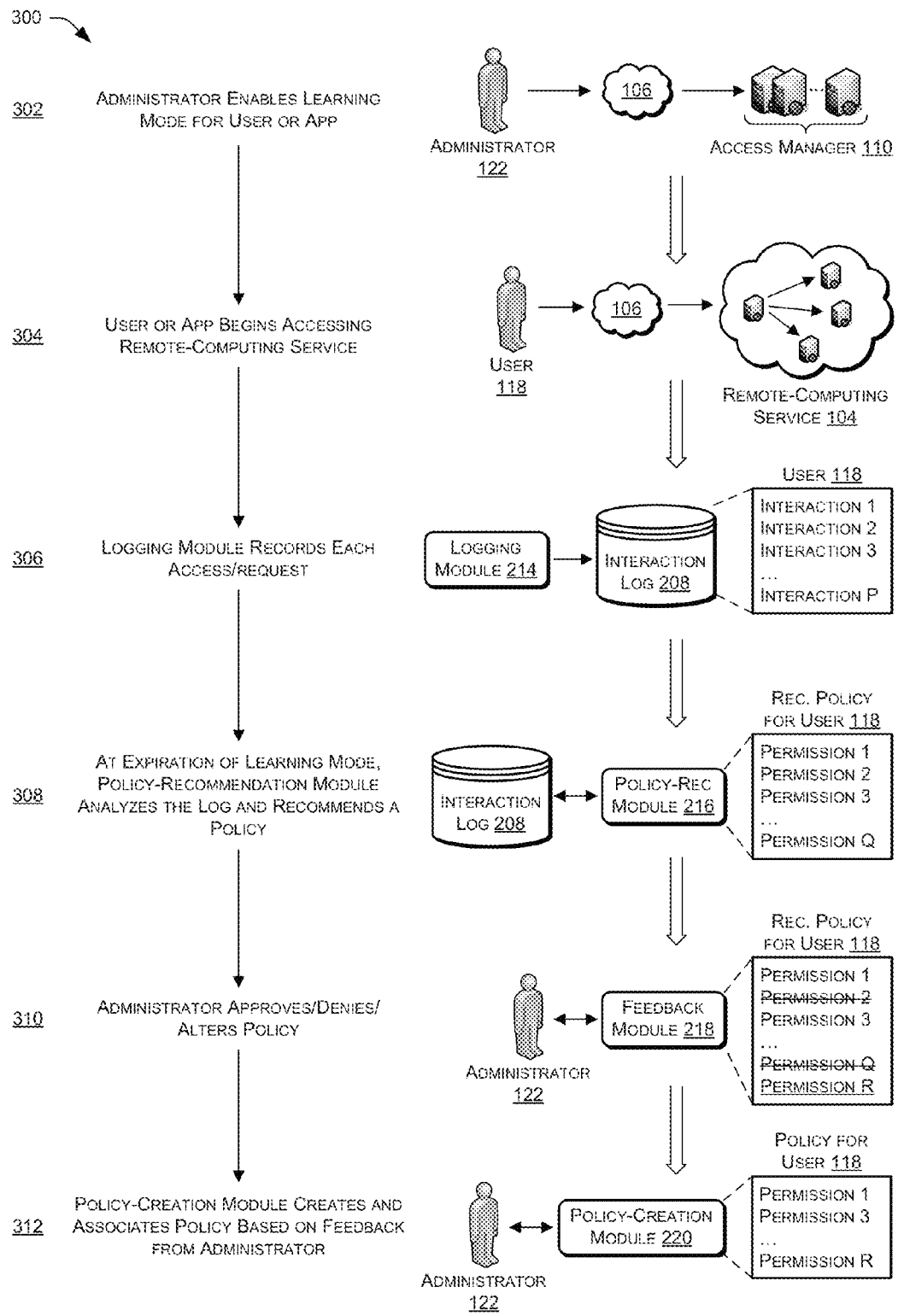
FIG. 3 is an example process of tracking an entity's actions and associating a custom policy to the entity based at least in part on these actions.

FIG. 3 is an example process 300 of tracking an entity's actions and associating a custom policy to the entity based at least in part on these actions, as described above. This process (as well as other processes described throughout) is illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

For discussion purposes, the process 300 (and the other processes) is described with reference to the environment 100 of FIG. 1, although other environments may implement this process.

The process 300 includes, at 302, an administrator of a particular customer (e.g., the administrator 122) enabling learning mode for a user or application of the particular customer. For instance, the administrator 122 may access the interface 112 of the access manager 110 and may assign a learning-mode policy to the user or the application, or may instead enable learning mode for the user or the application without regard to the currently-assigned access policy. The administrator may enable learning mode for a certain amount of time, for a certain number of accesses or requests, or until the administrator 122 requests to end the learning mode for the user or the application.

At 304, the user or application begins accessing resources of the remote-computing service 104. At 306, the logging module 214 stores these interactions in the interaction log 208. These stored interactions may indicate the resource accessed, the API called, the data accessed, the time of day of the interaction, and the like. At 308, the policy-recommendation module 216 analyzes the interaction log 208 and recommends a policy based at least in part on the interactions stored therein. The policy-recommendation module 216 may analyze and recommend this policy at least in part after the expiration of the learning-mode policy. This module 216 may additionally or alternatively perform some or all of this analysis and recommending while the user or application is still associated with the learning-mode policy. In the illustrated example, the module 216 has recommended a policy that includes example permissions 1-Q.

At 310, the administrator 122 receives an indication of the recommended policy and approves, rejects, or alters the recommended policy. In the illustrated example, the administrator 122 removes example permissions 2 and Q, while adding permission R. At 312, the policy-creation module 220 creates the policy based on the recommended policy and on the feedback from the administrator 122. The module 220 then assigns this created policy to the user or the application. At this point, the user or the application is able to access resources of the remote-computing service 104 in accordance with the created and assigned policy.

Figure 4:
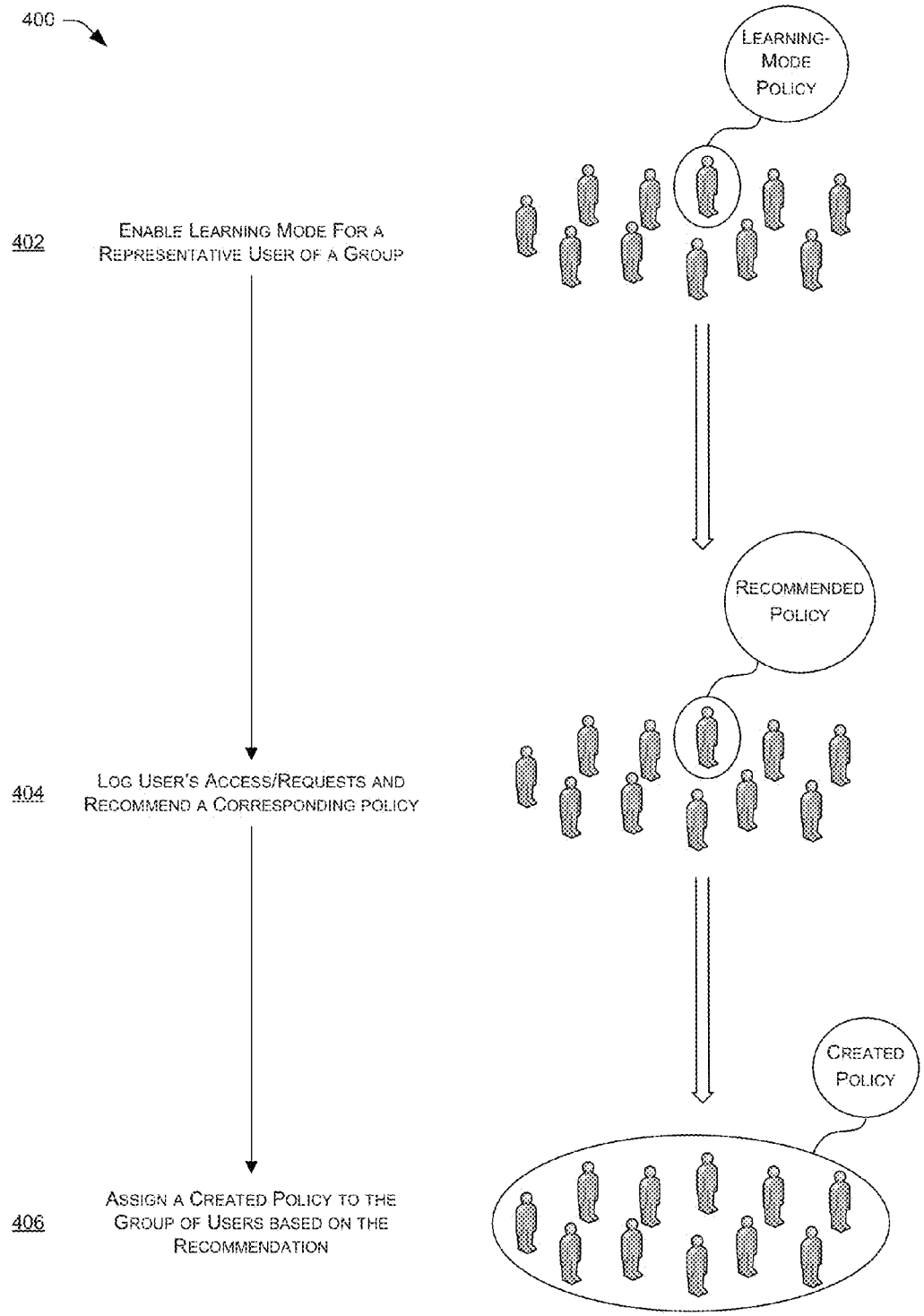
FIG. 4 is an example process of customizing a policy for a representative user of a group and then assigning the custom policy to the group of users as a whole.

FIG. 4 is an example process 400 of customizing a policy for a representative user of a group and then assigning the custom policy to the group of users as a whole. The process 400 may apply equally to applying custom policies to similarly-situated applications in some instances.

At 402, an administrator or another entity (e.g., remote-computing service 104) enables learning mode for a representative user of a group of users. For instance, the user may comprise a group of software developers, a group of sales people, a group of IT professionals, a group of marketers, or any other group of users. This group of users may be within a single customer or they may be across multiple different customers. The administrator or other entity may enable the learning mode by assigning the user to a learning mode policy or by otherwise indicating in the user's account with the service that the user should be in learning mode (and, hence, that the user's interactions should be tracked), regardless of the particular policy associated with the user.

At 404, the learning-mode module 114 logs the user's interactions with the remote-computing service 104 and generates a recommended policy for the user. The module 114 may also assign this policy to the user, or the module 114 may first receive feedback from an administrator or another entity.

At 406, the learning-mode module 114 assigns a policy based at least in part on the recommended policy to the entire group of users. For instance, the module 114 may assign the recommend policy to the group or may assign the recommended policy subject to the feedback from the administrator or other entity. In either instance, the process 400 represents that the module 114 may recommend a policy for a subset of user(s) of a group of similarly-situated users and may then extrapolate this policy to the group.

Figure 5:
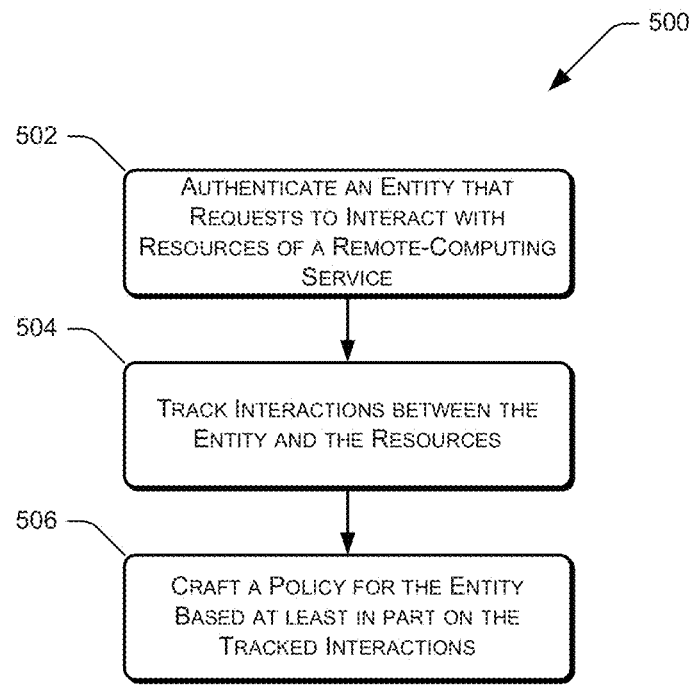
FIG. 5 is a flow diagram of another process for creating a custom policy based on actions of an entity.

FIG. 5 is a flow diagram of another process 500 for creating a custom policy based on actions of an entity. The process 500 includes an operation 502, which represents authenticating an entity that requests to interact with resources of a remote-computing service. The entity may comprise a user or an application as discussed above. An operation 504 then represents tracking interactions between the entity and the remote-computing service. This may include tracking the resources and data accessed, the APIs called, and the like. An operation 506 further represents crafting a policy for the entity based at least in part on the tracked interactions.

Figure 6:
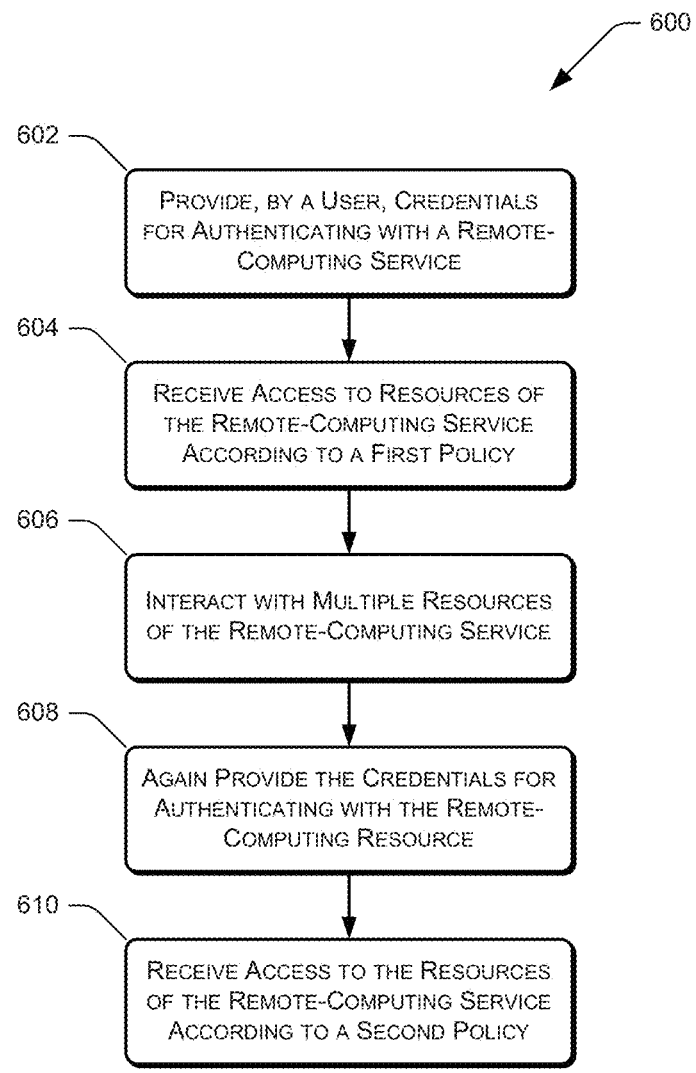
FIG. 6 is a flow diagram of a process that a user may employ when accessing resources of the remote-computing service of FIG. 1. As illustrated, this process includes accessing the resources according a first access policy, and then later accessing the resources of second access policy that has been custom for the user based on the user's previous interactions with the service.

FIG. 6 is a flow diagram of a process 600 that a user of a particular customer may employ when accessing resources of the remote-computing service of FIG. 1. An operation 602 first represents providing, by the user operating a client computing device, credentials for authenticating with a remote-computing service. The credentials may include a username and password, biometric credentials, or any other suitable credentials that may be used for authentication purposes. An operation 604 then represents receiving access to resources of the remote-computing service according to a first policy after authenticating with the remote-computing service. In some instances, the first policy is a learning-mode policy where the user has access to all or substantially all (e.g., 80%, 90%, 95%, etc.) of the resources associated with the particular customer.

At an operation 606, the user then interacts with the resources of the remote-computing service. At a later time, and potentially after logging out from the remote-computing service, the user may again provide the credentials of the user at an operation 608. After authentication, the user may receive access to the resources of the remote-computing service according to a second, different policy at an operation 610. This second policy may have been created and assigned to the user based at least in part on the previously-tracked interactions. In some instances, the second policy may be narrower than the first policy and may include permissions to access those resources with those API calls that the user accessed while operating in the confines of the first policy.

Conclusion

Note that the various techniques described above are assumed in the given examples to be implemented in the general context of computer-executable instructions or software, such as program modules, executed by one or more computers or other devices. Generally, program modules include routines, programs, objects, components, data structures, etc. for performing particular tasks or implement particular abstract data types.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims. For example, the methodological acts need not be performed in the order or combinations described herein, and may be performed in any combination of one or more acts.

What is claimed is:

1. A method comprising:
under control of one or more computer systems configured with specific executable instructions,
authenticating an entity that requests to interact with resources of a remote-computing service, the entity comprising one of multiple entities that request to interact with resources of the remote-computing service, a first portion of the multiple entities being associated with a first mode indicating that interactions are to be tracked for crafting an access policy, and a second portion of the multiple entities associated with a second, different mode, the second mode indicating that interactions are not to be tracked for crafting the access policy;
determining, based at least in part on the authenticating, that the entity is associated with the first mode;
determining a training procedure that provides the entity with access to predetermined resources of the remote-computing service for a predetermined interval;
in response to the determining that the entity is associated with the first mode, tracking interactions between the entity and the predetermined resources of the remote-computing service during the training procedure;
in response to expiration of the predetermined interval, crafting the access policy for the entity based at least in part on the tracked interactions between the entity and the predetermined resources of the remote-computing service that occurred during the training procedure; and
associating the access policy with the entity and associating the entity with the second mode.

2. The method as recited in claim 1, further comprising, prior to the associating the entity to the access policy:
receiving one or more modifications to the access policy at least partly in response to the tracked interactions and the expiration of the predetermined interval; and
modifying the access policy based at least in part on the one or more modifications.

3. The method as recited in claim 1, wherein the entity is associated with a customer of the remote-computing service, and further comprising, after the authenticating and prior to the tracking:
determining that the entity is associated with an access policy that grants the entity access to individual resources of the remote-computing service that is associated with the customer; and
granting the entity access to the individual resources of the remote-computing service that are associated with the customer at least partly in response to the determining.

4. The method as recited in claim 1, wherein the crafted access policy limits the entity access to those resources that the entity accessed during the interactions between the entity and the remote-computing resource.

5. The method as recited in claim 1, wherein the resources of the remote-computing service include a network-based storage resource and a network-based compute resource.

6. The method as recited in claim 1, wherein the entity comprises a user or an application associated with a customer of the remote-computing service.

7. The method as recited in claim 1, wherein the predetermined interval comprises at least one of a predetermined period of time or a predetermined number of access requests.

8. The method as recited in claim 1, wherein the access policy granted during the training procedure provides access to substantially all resources of the remote-computing service.

9. The method as recited in claim 1, wherein the access policy provides the entity with access to resources of the remote-computing service during one or more predetermined times of the day.

10. The method as recited in claim 1, wherein the access policy includes access to fewer resources of the remote-computing service, in comparison to the predetermined resources granted during the training procedure.

11. A method comprising:
under control of one or more computer systems configured with specific executable instructions,
providing, by a user of a customer of a remote-computing service, credentials for authenticating with the remote-computing service, the credentials indicating to the remote-computing service that interactions between the user and the remote-computing service are to be tracked for crafting an access policy for the user, wherein credentials of other users of customers of the remote-computing service indicate to the remote-computing service that interactions between the other users and the remote-computing service are not to be tracked for creating access policies for the other users;
after authentication, receiving access to at least a portion of resources of the remote-computing service for a predetermined interval according to a first access policy associated with the user;
interacting with multiple resources of the at least a portion of the resources of the remote-computing service based at least in part on the received access;
in response to expiration of the predetermined interval, providing, by the user, the credentials for authenticating with the remote-computing service after interacting with the multiple resources;
determining a second access policy to be associated with the user based at least in part on the interacting, wherein the second access policy indicates to the remote-computing service that interactions between the user and the remote computing service are not to be tracked for crafting the access policy; and
receiving access to the resources of the remote-computing service according to the second access policy associated with the user.

12. The method as recited in claim 11, wherein the first access policy grants the user access to individual resources of the remote-computing service associated with the customer.

13. The method as recited in claim 11, wherein the second access policy grants the user access to those resources of the remote-computing service that the user interacted with during the interacting.

14. The method as recited in claim 11, wherein the second access policy grants the user access to fewer resources of the remote-computing service than does the first access policy.

15. The method as recited in claim 11, wherein the authenticating comprises associating the user with a particular access policy of the customer by associating the user with at least one of a customer account or access policy table that associates the user with the customer.

16. A method comprising:
under control of one or more computer systems configured with specific executable instructions,
determining that an entity is associated with a first mode or a second, different mode, the first mode indicating that interactions between the entity and resources of a computing system are to be tracked for crafting an access policy for the entity, the entity comprising one of multiple entities that interact with the resources of the computing system, a first portion of the multiple entities being associated with the first mode, and a second portion of the multiple entities being associated with the second, different mode, the second mode indicating that interactions are not to be tracked for crafting the access policy;
determining a training procedure that provides the entity with access to predetermined resources of the computing system for a predetermined interval;
in response to the determining that the entity is associated with the first mode, tracking interactions between the entity and the predetermined resources of the computing system during the training procedure;
in response to expiration of the predetermined interval, crafting the access policy for the entity based at least in part on the tracked interactions between the entity and the predetermined resources of the computing system that occurred during the training procedure; and
associating the access policy with the entity and associating the entity with the second mode.

17. The method as recited in claim 16, wherein the entity comprises a user and the computing system comprises a personal computing device that the user is operating.

18. The method as recited in claim 16, wherein the entity comprises a user or application and the computing system comprises a remote-computing service that the user or application is accessing over a network.

19. The method as recited in claim 16, wherein the crafting an access policy for the entity occurs in response to expiration of the predetermined interval.

20. The method as recited in claim 16, wherein the predetermined interval comprises at least one of a predetermined period of time or a predetermined number of access requests.

21. The method as recited in claim 16, wherein the access policy includes access to fewer resources of the computer system, in comparison to the predetermined resources granted during the training procedure.

22. The method as recited in claim 16, wherein the access granted during the training procedure provides access to substantially all resources of the remote-computing service.

23. The method as recited in claim 16, wherein the predetermined interval comprises at least one of a predetermined period of time or a predetermined number of access requests.

* * * * *